(12) United States Patent
Milles et al.

(10) Patent No.: US 8,273,185 B2
(45) Date of Patent: Sep. 25, 2012

(54) CLEANING A VEHICLE EXHAUST FILTER

(75) Inventors: David Herbert Milles, Gainsborough (GB); Peter Ivan Forster, Gainsborough (GB)

(73) Assignee: Ceramex Limited, Gainsborough (GB)

( * ) Notice: Subject to any disclaimer, the term of this patent is extended or adjusted under 35 U.S.C. 154(b) by 0 days.

(21) Appl. No.: 13/384,513

(22) PCT Filed: Jul. 9, 2010

(86) PCT No.: PCT/GB2010/051133
§ 371 (c)(1),
(2), (4) Date: Jan. 17, 2012

(87) PCT Pub. No.: WO2011/012876
PCT Pub. Date: Feb. 3, 2011

(65) Prior Publication Data
US 2012/0111370 A1    May 10, 2012

(30) Foreign Application Priority Data
Jul. 25, 2009 (GB) .................................. 0912990.9

(51) Int. Cl.
*B08B 7/04* (2006.01)
*B08B 3/00* (2006.01)
*B08B 9/00* (2006.01)
*B01D 46/04* (2006.01)

(52) U.S. Cl. ........ 134/22.18; 134/10; 134/34; 134/94.1; 134/166 R; 134/169 A; 95/278; 95/279; 95/280

(58) Field of Classification Search ........................ None
See application file for complete search history.

(56) References Cited

U.S. PATENT DOCUMENTS
2,615,456 A    10/1952    Galusha
(Continued)

FOREIGN PATENT DOCUMENTS
EP    0 572 356    12/1993
(Continued)

OTHER PUBLICATIONS
English Machine Translation of EP 1336729 A1.*

*Primary Examiner* — Michael Barr
*Assistant Examiner* — Nicole Blan
(74) *Attorney, Agent, or Firm* — Burr & Brown

(57) ABSTRACT

A method of cleaning a vehicle exhaust system filter (1), the filter (1) having a first end (11) and a second end (10) and comprising a plurality of elongate channels (6) containing debris (19) to be removed, comprises the steps of: (i) providing a chamber (14) having an outlet in fluid communication with the first end (11) of the filter (1); (ii) covering the second end (10) of the filter (1) to hinder fluid flow out of the second end of the filter; (iii) introducing a flow of liquid into the chamber (14); (iv) stopping the flow of liquid into the chamber (14) when the chamber and channels (6) of the filter are substantially filled with liquid; (v) introducing a pulse of compressed gas into the chamber (14), and (vi) uncovering the second end (11) of the filter (1) to allow the gas to force said debris (19) and liquid (17) out of the second end (10) of the filter (1). The invention also provides apparatus for use in the method.

14 Claims, 13 Drawing Sheets

U.S. PATENT DOCUMENTS

| | | | |
|---|---|---|---|
| 2,902,158 A | 9/1959 | Muller | |
| 3,670,478 A | 6/1972 | Welsh et al. | |
| 3,688,780 A | 9/1972 | Everroad | |
| 3,765,051 A | 10/1973 | Wanat | |
| 3,771,934 A | 11/1973 | Delves-Broughton | |
| 3,778,495 A | 12/1973 | Woolley | |
| 4,120,671 A | 10/1978 | Steinmeyer | |
| 4,145,194 A | 3/1979 | Horlacher, Jr. et al. | |
| 4,433,698 A | 2/1984 | Blaul | |
| 4,443,269 A | 4/1984 | Capella et al. | |
| 4,445,912 A | 5/1984 | Volk et al. | |
| 4,452,616 A | 6/1984 | Gillingham et al. | |
| 4,585,019 A | 4/1986 | Jacobson | |
| 4,624,689 A | 11/1986 | Volk et al. | |
| 4,655,987 A | 4/1987 | Zertuche | |
| 4,707,393 A | 11/1987 | Vetter | |
| 4,832,753 A | 5/1989 | Cherry et al. | |
| 4,864,821 A | 9/1989 | Hoch | |
| 4,910,047 A | 3/1990 | Barnett et al. | |
| 4,936,922 A | 6/1990 | Cherry | |
| 5,143,529 A | 9/1992 | Means, Jr. | |
| 5,232,299 A | 8/1993 | Hiss | |
| 5,242,472 A | 9/1993 | Sellakumar | |
| 5,254,144 A | 10/1993 | Provol | |
| 5,322,535 A | 6/1994 | Simms et al. | |
| 5,444,892 A | 8/1995 | Ris et al. | |
| 5,584,900 A | 12/1996 | Zaiser et al. | |
| 5,658,644 A | 8/1997 | Ho et al. | |
| 5,725,618 A | 3/1998 | Shimoda et al. | |
| 5,766,281 A | 6/1998 | Luy et al. | |
| 5,868,807 A | 2/1999 | Luy et al. | |
| 5,895,521 A | 4/1999 | Otsuka et al. | |
| 6,554,138 B1 | 4/2003 | Bihlet et al. | |
| 6,799,687 B1 | 10/2004 | Schön | |
| 6,973,906 B2 | 12/2005 | Yoshida et al. | |
| 7,410,530 B2 | 8/2008 | Wagner et al. | |
| 7,550,102 B2 | 6/2009 | Herrington | |
| 2002/0014156 A1 | 2/2002 | Leibold et al. | |
| 2003/0101717 A1 | 6/2003 | Dittler et al. | |
| 2004/0045439 A1 | 3/2004 | Zilliox et al. | |
| 2004/0187946 A1 | 9/2004 | Herrington | |
| 2006/0201326 A1 * | 9/2006 | Wagner et al. | 95/280 |

FOREIGN PATENT DOCUMENTS

| | | | |
|---|---|---|---|
| EP | 1 060 780 | | 12/2000 |
| EP | 1 252 919 | | 10/2002 |
| EP | 1 336 726 | | 8/2003 |
| EP | 1 336 729 | | 8/2003 |
| EP | 1336729 | A1 * | 8/2003 |
| EP | 1 698 765 | | 9/2006 |
| FR | 2 815 884 | | 5/2002 |
| FR | 2 821 763 | | 9/2002 |
| FR | 2 869 814 | | 11/2005 |
| GB | 831235 | | 3/1960 |
| WO | 01/37965 | | 5/2001 |
| WO | 01/81017 | | 11/2001 |
| WO | 2006/016117 | | 2/2006 |

* cited by examiner

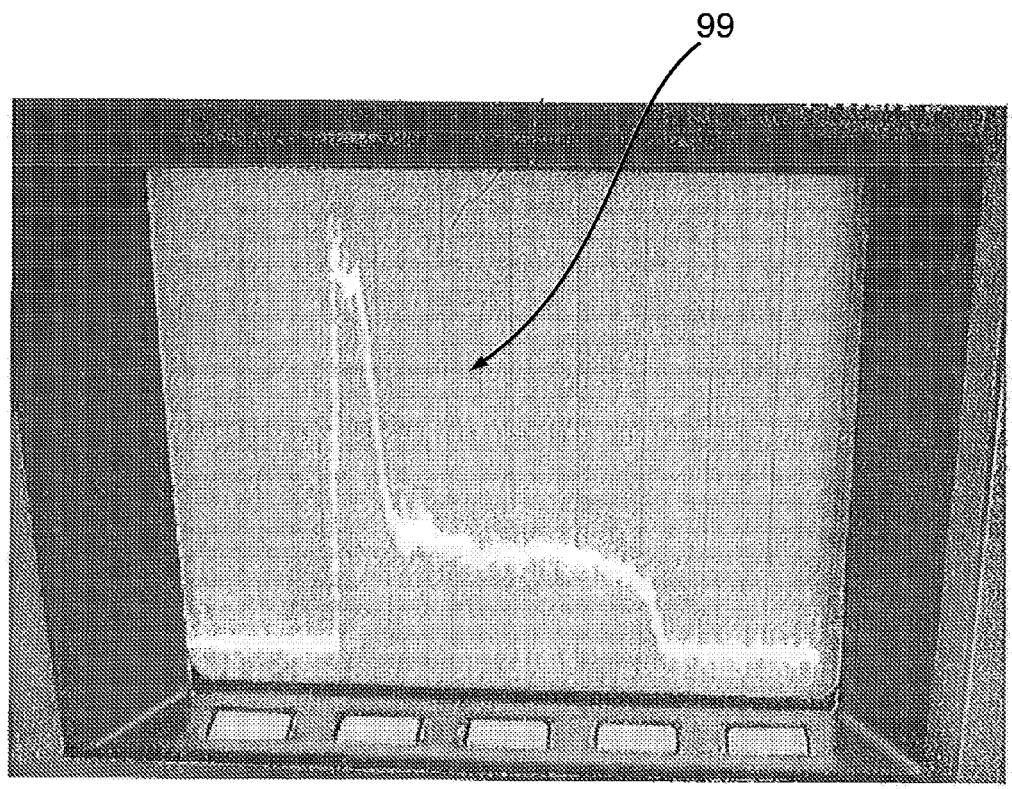
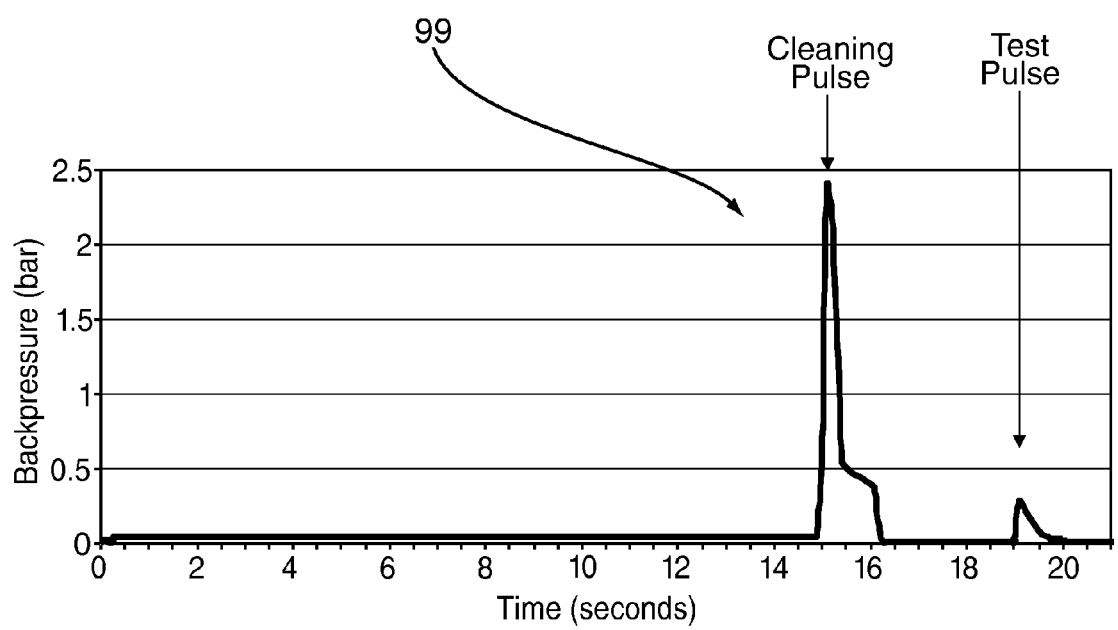
FIG. 12

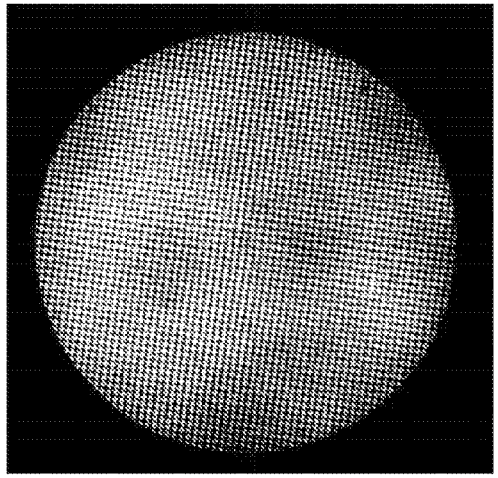
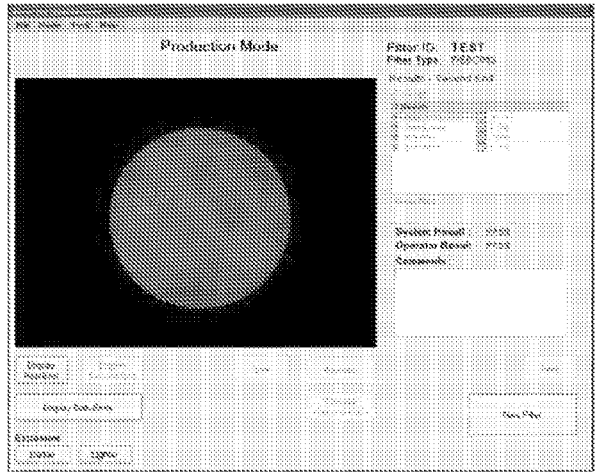

Transmitted light image of a cleaned filter showing almost all channels completely clear and filter structure in good condition Processed image of the filter with percentages and Pass / Fail status

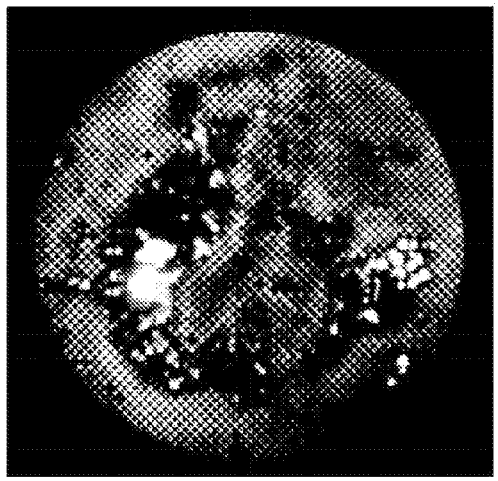
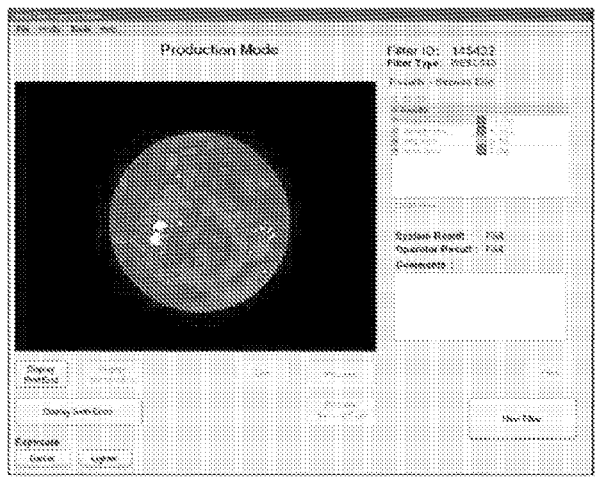

Transmitted light image of a cleaned filter showing thermal damage resulting in destruction of channel walls and blocking of channels Processed image of the filter with percentages and Pass / Fail status

*FIG. 13*

CLEANING A VEHICLE EXHAUST FILTER

BACKGROUND a. Field of the Invention

This invention relates to a method and apparatus for cleaning vehicle exhaust system particulate filters and other components associated with emissions control from diesel engines. The process may be suitable for cleaning any type of filter provided that it is enclosed by a solid external casing and has rigid filter membrane or cell structure.

b. Related Art

Many modern diesel powered vehicle exhaust systems are provided with filters for removing particulate matter from the vehicle's exhaust stream. These are typically wall flow filters which are cylindrical ceramic or other type of monoliths having elongate channels running along their length. The channels are alternately plugged at a first or second end such that gas entering a channel at one end cannot exit the same channel at its other end. To exit, the gas must pass from one channel to the next through the porous walls of the filter. In doing so, soot and ash within the gas are deposited within and on the walls of the filter.

Modern diesel exhaust systems are fitted with particulate filters that can be categorised as Passive or Active.

With Passive filters, heat and gases from the engine are used to cause the particulate carbon to burn off, thereby regenerating the filter. The amount of soot and ash deposited, and the ability of the filter to regenerate depends on both the condition of the engine and the duty cycle.

At elevated operating temperatures, such filters regenerate themselves and effectively self-clean, because the higher temperatures burn the deposited soot out of the filter. However, with lower exhaust gas temperatures, caused for example by stop/start city driving, or after prolonged use, the filter can become blocked with heavy deposits of particulate carbon. The exothermic reaction that results from rapid burn-off of heavy carbon deposits can be so severe that damage is caused to the filter's integrity. This may have the consequence of just reducing the effectiveness of the filter, but more commonly the filter has to be replaced. Even when ideal conditions exist the filter will slowly become clogged with ash and other non-combustible materials resulting in increased backpressure within the exhaust system that has a detrimental effect on performance and fuel efficiency.

Active filters are suited to engines that typically have short or low performance duty cycles. These filters are used in conjunction with external actions that are implemented to aid combustion of carbon deposited on the filter as they build up. Once again ash and other products of combustion will accumulate on the filter, slowly reducing performance and fuel efficiency.

One way to reduce these problems is through a regular maintenance regime which includes periodic cleaning. Preferably cleaning of the filter is performed once a year, but depending on usage, the filter may be cleaned two or three times a year.

Existing cleaning methods are time consuming and can be difficult to implement. One standard method used to clean a filter involves introducing a jet of compressed air into one or both ends of the filter to blow out the soot and ash. However, the compressed air often does not fully clean the filter, resulting in reduced service life and increasing the likelihood of premature failure due to irreversible blockage or thermal damage. It has been proposed in EP 1 336 729, to clean a vehicle exhaust filter by first filling the filter housing with a flushing agent heated to 85° C. The filter is soaked with the hot flushing agent for 3-8 minutes, and agitated with a vibrator, followed by expulsion of the flushing agent with compressed air. In EP 1 252 919 it is proposed to carry out a plurality of successive cleaning cycles, during each of which a cleaning liquid at a feed pressure is brought into contact with the whole of the outlet face of the filter medium by means of a gas at a first pressure above atmospheric, after which a cleaning pressure is exerted by means of a gas at a higher pressure than the first pressure.

The invention seeks to provide an improved method and apparatus for cleaning vehicle exhaust system filters.

SUMMARY OF THE INVENTION

Aspects of the invention are specified in the independent claims. Preferred features are specified in the dependent claims.

An aspect of the cleaning method of the present invention comprises filling a filter to be cleaned with water and then introducing a pressure wave of compressed air in a controlled manner. This method has been shown to have improved cleaning ability over existing methods. In addition, the method is quick, simple to use and is able to clean heavily clogged filters which were unable to be cleaned successfully using previous methods. A single pass is sufficient to clean most filters, and elevated temperatures or vibration apparatus are not required. The apparatus and method are particularly suited to cleaning filters used with engines and fuels that produce particulate carbon.

BRIEF DESCRIPTION OF THE DRAWINGS

The invention will now be further described, by way of example only, and with reference to the accompanying drawings, in which:

FIG. 12 shows two plots of the change in pressure in the purge chamber during the cleaning process. In the upper picture the horizontal scale is 1 square=0.2 s and the vertical scale is 1 square=0.25 bar (25 kPa);

FIG. 13 shows optical inspection results for two filters cleaned in accordance with an embodiment of the present invention.

DETAILED DESCRIPTION

Figure 1:
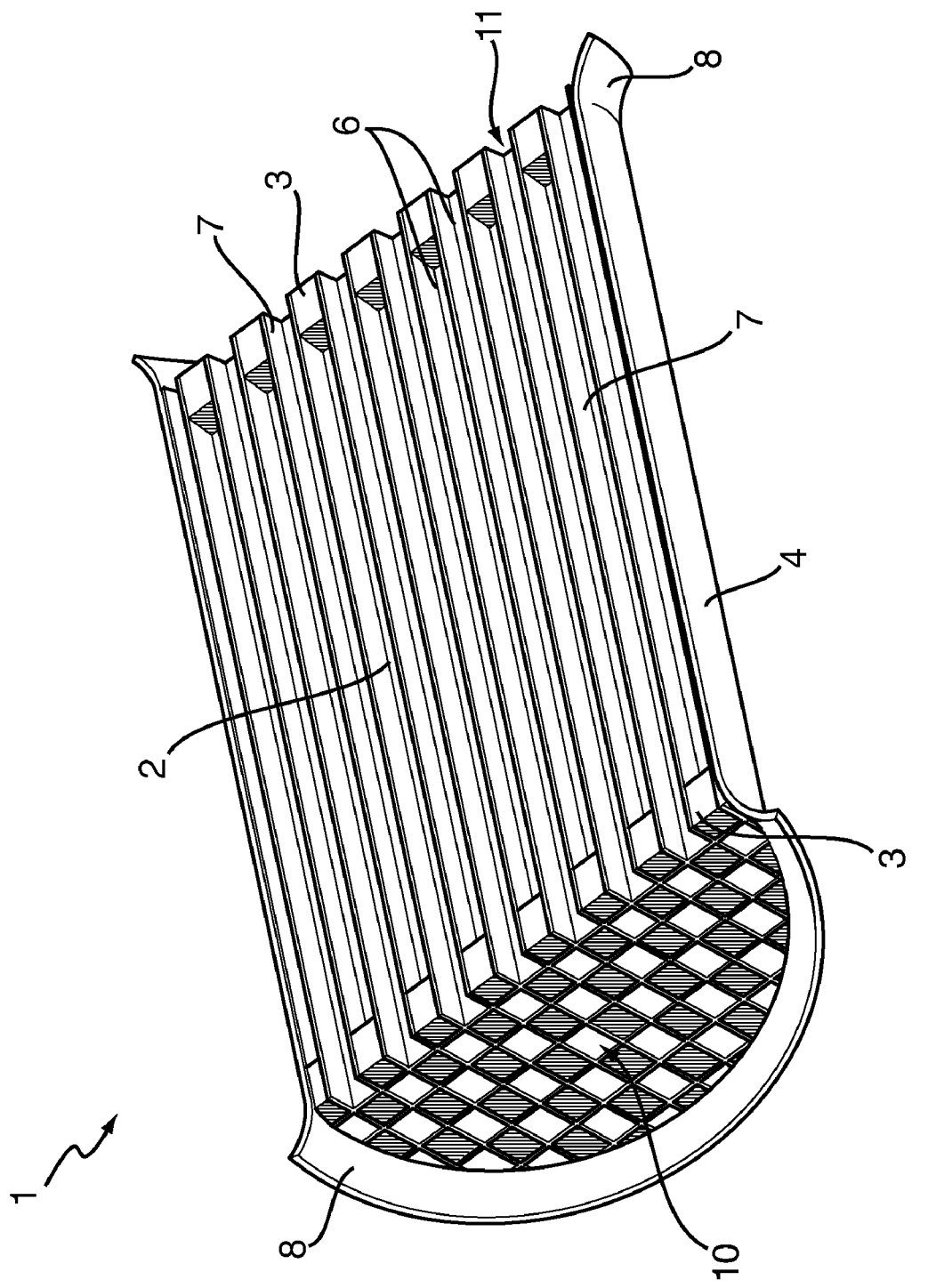
FIG. 1 shows a partial perspective diagram of a wall flow filter.

FIG. 1 shows a schematic diagram of a wall flow filter 1 comprising a cylindrical ceramic monolith core 2 contained within a cylindrical metal surround or sleeve 4. The overall diameter of a filter 1 for a vehicle exhaust system is generally between 200 and 400 mm. The ceramic filter cores 2 have a number of elongate channels 6 running along their length. These channels 6 generally have an approximately square cross-section and are about 0.75-2 mm in width. In FIG. 1 the relative size of the channels 6 compared to the dimensions of the filter 1 has been increased for clarity. Between the channels 6 the walls 7 of the filter core 2 are formed from a porous ceramic. The ceramic may be, for example, cordierite (magnesium iron aluminium cyclosilicate), silicon carbide, or aluminium titanate. Typical porosities are between 40 and 50% with a mean pore size between 10 and 20 μm, or smaller for Euro 6 filters. Neighbouring channels 6 in the filter 1 are plugged at alternate ends with plugs 3 of a ceramic material so that exhaust gases entering a channel 6 at one end cannot exit the same channel 6 at its other end. To exit, the gas must pass from one channel 6 to the next through the porous walls 7 of the filter 1. The metal sleeve 4 of the filter 1 includes flanges 8 at each end which, when in use, aid the connection of the filter 1 to other parts of a vehicle's exhaust system. In the embodiment shown in FIG. 1, the flanges 8 usually extend outwards at an angle from the top and bottom edges of the cylindrical sleeve 4. However, the flanges may be of a different design to accept a variety of fittings.

When installed in a vehicle exhaust system, typically an exhaust system of a diesel engine, the exhaust gases flow through the filter 1 from a second end 10 to a first end 11. Particulate matter therefore builds up in those channels 6 having their open ends at the second end 10 of the filter. Because the particulate matter, typically soot and ash, is trapped and removed from the gas stream by the porous ceramic walls 7, the channels 6 having open ends at the first end 11 of the filter are generally significantly cleaner than the other channels 6.

Figure 2:
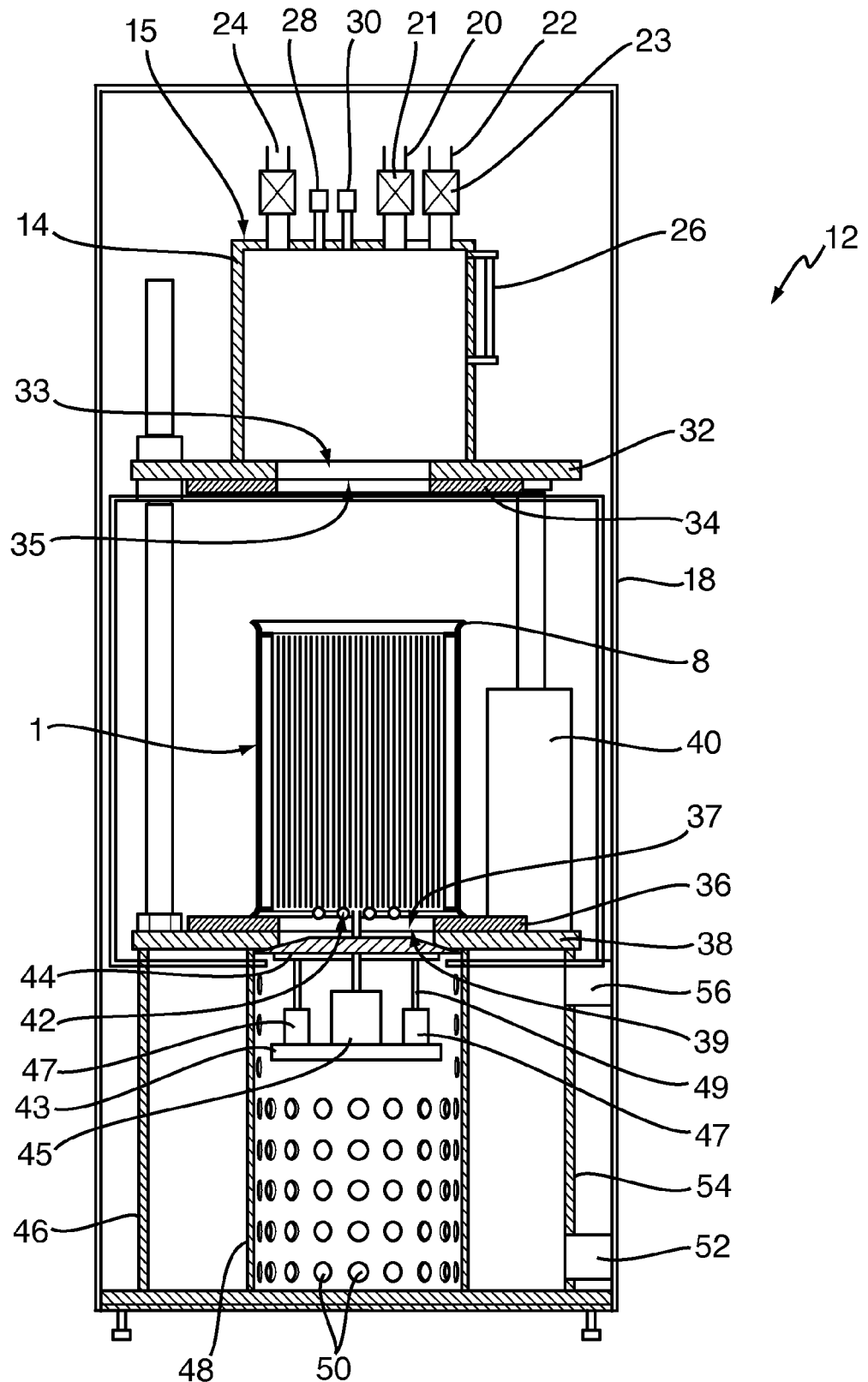
FIG. 2 shows a cross-sectional schematic view of an apparatus for cleaning a vehicle exhaust system filter according to a first embodiment of the present invention.

A first preferred embodiment of an apparatus 12 for cleaning such filters 1 is shown in FIG. 2. The apparatus 12 comprises a purge chamber 14, a collecting tank 46 and a mechanism 40 for holding and positioning a filter 1 to be cleaned between the purge chamber 14 and the collecting tank 46. A frame 18 or outer casing surrounds the apparatus 12 and helps to maintain the alignment of the sections of the apparatus 12 and contain any fluids that may leak from the filter 1 during cleaning.

The purge chamber 14 is a cylindrical metal chamber with an internal volume approximately equal to the volume of the filter 1 being cleaned, in this example 20 liters. Filters to be cleaned may have a volume greater than or less than 20 liters and are typically between 2 and 35 liters. The volume of the purge chamber appears not to be critical. For example, it has been shown that, for a 20 liter filter, the purge chamber may have a volume of 8, 12, 20 or 24 liters and give equally good cleaning results. Volume of 5 liters or less, although sufficient to clean the filter, are too small successfully to flush all the removed material into the collection tank, resulting in build-up of debris on the working faces.

The purge chamber 14 has inlet means for introducing fluids into the chamber. In this embodiment the inlet means comprise two inlets 20, 22 in the top face 15 of the purge chamber 14. A first inlet 20 is connected to a supply of liquid, in this example water, and comprises a first valve 21 used to control the flow of water into the purge chamber 14. In this embodiment, the inlet 20 has a diameter of about 1" (2.5 cm) and the water is drawn directly from a mains water supply at a pressure of about 2 bar (200 kPa). In this description pressures are given relative to atmospheric pressure, so that a pressure of 2 bar (200 kPa) is 2 bar (200 kPa) above atmospheric pressure or in other words an absolute pressure of 3 bar (300 kPa).

A second inlet 22 is connected to a supply of compressed gas, in this case compressed air. In this embodiment, the compressed air is stored in a pressure vessel (not shown) at a pressure of 10 bar (1000 kPa). A second valve 23 is positioned between the pressure vessel and the purge chamber 14, and will typically be at the inlet to the purge chamber. The second valve 23 is able to open and close quickly to introduce a pulse of compressed air into the purge chamber 14, as will be explained in more detail later. It will be understood that the inlets for liquid and gas, although separately connected to the chamber in this embodiment, could feed into a single common inlet to the chamber 14.

The purge chamber 14 also comprises an outlet or vent 24 on its top surface 15, the purpose of which is to allow air to escape the chamber 14 as it is being filled with water and to act as a filter protection relief valve should excessive differential pressure develop across the filter during the cleaning cycle. It is therefore desirable that the vent 24 is positioned at or near the top of the chamber 14. In alternative embodiments the vent 24 may be positioned on a side of the chamber 14 proximal the top face 15. In some embodiments it may be preferable for the gas inlet 22 to also act as the vent 24 so that a separate outlet is not required. The purge chamber 14 also includes a viewing window 26 near the top of the chamber 14 to allow a user to see inside the chamber to establish the water level within the purge chamber 14.

A pressure gauge 28 and pressure relief valve 30 are also attached to the top of the purge chamber 14 to monitor the pressure of compressed air in the chamber 14 and to permit excess air to escape if the pressure rises above the design limit.

The purge chamber may also have an additional large diameter inlet with control valve (not shown) to allow the introduction of high volume hot air for filter drying purposes.

A retaining plate 32 forms a lower face of the purge chamber 14 and includes an opening 33 having a diameter slightly smaller than the diameter of a core 2 of a filter to be cleaned 1. The surface area of the retaining plate 32 is larger than the cross-sectional area of the chamber 14 so that the retaining plate 32 extends beyond the periphery of the purge chamber 14, and the purge chamber 14 is attached to the top surface of the retaining plate 32 in such a way as to form a fluid tight seal. The opening 33 is centrally located in the retaining plate 32 and is axially aligned with the purge chamber 14.

A first seal element 34 is attached to the underside of the retaining plate 32. This seal element 34 includes an aperture 35 having, in this example, the same diameter as the opening 33 in the retaining plate 32. In general, the diameter of the aperture is designed to be slightly smaller than the diameter of the flange 8.

The seal element 34 is used to form a fluid tight seal between the retaining plate 32 and the flange 8 at the top edge of a filter 1.

The opposing end of the filter 1 sits on a second seal element 36 and mounting plate 38 which are mounted at a distance from the retaining plate 32 and first seal element 34. The mounting plate 38 has dimensions similar to the retaining plate 32 and includes a centrally located opening 39 with a diameter no larger than the diameter of the largest filter core 2 to be cleaned. The second seal element 36 has an aperture 37 that is typically the same size as the first seal element 34, and is aligned with, the opening 39 in the mounting plate 38.

The apparatus 12 further comprises means 40 for clamping and holding a filter 1 between the first 34 and second 36 seal elements. In a first embodiment, the clamping means 40 comprises a piston 40 fixed between the upper surface of the mounting plate 38 and the lower surface of the retaining plate 32. In a first, extended position the piston 40 holds the retaining plate 32 and purge chamber 14 at a distance from the mounting plate 38, so that the distance is significantly greater than the length of a filter 1 to be cleaned, to allow a filter 1 to be loaded easily into the apparatus 12. In a second, closed position, the piston 40 pulls the retaining plate 32 towards the mounting plate 38 thereby clamping a filter 1 between the first 34 and second 36 seal elements.

In this embodiment support members 42 are provided to support the end of the filter core 2. The support members 42 are mounted on a support frame 43 below the mounting plate 38 and protrude upwards through the opening 39 in the mounting plate 38 and contact the face of the filter core 2 at several points. The support members 42 may be assembled together as a single component. As the compressed air enters and flows through the filter 1, the increased pressures may cause parts of the ceramic core 2 to break or be pushed out by the force of the fluid. The support members 42 and support frame 43 are designed to restrict the movement of the ceramic core 2, thereby limiting or preventing breakage of the core 2 as it is being cleaned without impeding the flow of the fluids out of the filter 1.

The support frame 43 additionally includes a piston 45 that presses the support members 42 against the face of the filter 1.

A gate member 44 is mounted directly beneath and connected to the mounting plate 38. The gate member 44 comprises a plug 44 movable between a closed position, in which the plug 44 covers the opening 39 in the mounting plate 38, and an open position, in which the gate panel 44 does not block the opening 39. The purpose of the gate member 44 is to hinder or prevent the flow of liquid from the filter 1 during a first stage of the cleaning process as will be described hereinafter. Means 47 for moving the gate plug 44 between open and closed positions are provided and, in this embodiment, are mounted on the support frame 43. In this example, a pair of pistons 47 raise and lower the gate member 44 towards and away from the mounting plate 38 via control rods 49. Alternatively, the gate member 44 may slide horizontally or rotate between open and closed positions or may be hinged.

A collecting tank 46 or waste tank is positioned beneath or behind the mounting plate 38 to collect and contain the waste fluid expelled from the lower end of the filter 1. In this embodiment the mounting plate 38 is integrally formed with the waste tank 46 so that the mounting plate 38 forms a top of the tank 46.

The waste tank 46 includes an anti-surge chamber 48 arranged to reduce the energy in the expelled fluid. In this case, the anti-surge chamber 48 comprises a metal cylinder having a plurality of holes 50. The anti-surge cylinder 48 is placed with one end directly below the opening 39 in the mounting plate 38 such that fluid passing through the opening 39 enters the interior of the anti-surge chamber 48 and must exit the chamber 48 through the holes 50 in the chamber wall.

The waste tank 46 also includes an outlet 52 in a lower portion of a side wall 54 of the tank 46 and a vent 56 in an upper portion of the side wall 54 of the tank 46. The outlet 52 and vent 56 connect the waste tank 46 to an optional expansion chamber or chimney (not shown), the purpose of which will be described hereinafter.

Figure 3:
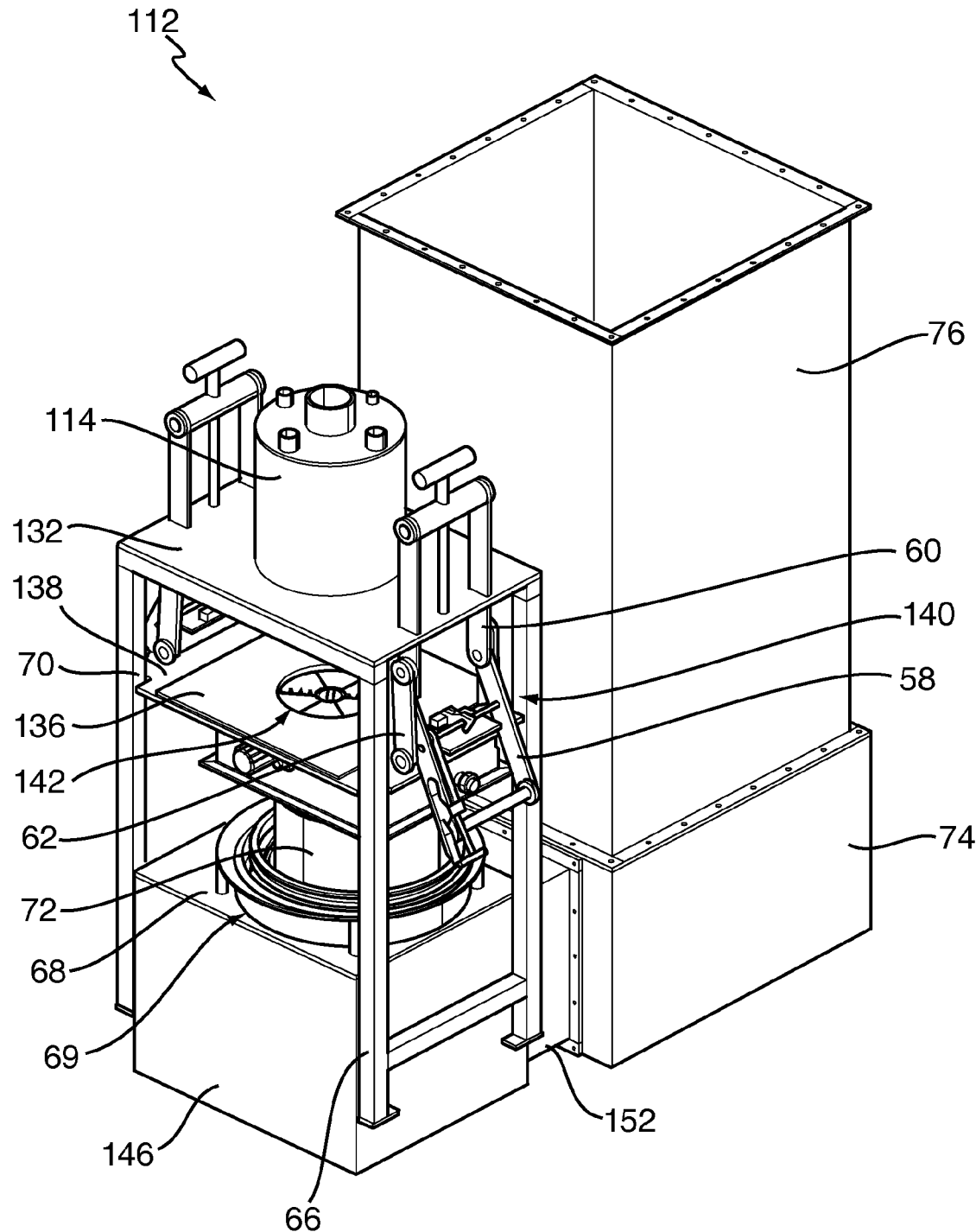
FIG. 3 shows a perspective view of an apparatus for cleaning a vehicle exhaust system filter according to a second embodiment of the present invention.

A second preferred embodiment of the present invention is shown in FIG. 3. This embodiment is similar to the embodiment shown in FIG. 2, and similar features have been indicated with reference numerals incremented by 100.

In this embodiment, the holding means 140 used to clamp the filter 101 in position between the first 134 and second 136 seal elements comprises a pivoted handle 58. In particular the clamping means 140 comprises a first pair of clamp members 60 extending approximately vertically downwards from the lower surface of the retaining plate 132 and a second pair of clamp members 62 extending substantially vertically upwards from an upper surface of the mounting plate 138. The handle 58 is rotatably connected between the first and second pairs of clamp members 60, 62, preferably via a rotatable connecting member (not shown). In this way, when the handle 58 is moved from a first position to a second position, the handle 58 pivots such that the two pairs of clamp members 60, 62 are drawn towards each other to decrease the gap between the mounting plate 138 and the retaining plate 132. The handle 58 may then be moved from the second position back to a first position causing the pairs of clamp members 60, 62 to separate and the gap between the mounting 138 and retaining plates 132 to increase. A filter 101 can, therefore, be loaded into the apparatus 112 with the handle 58 in a first position and then held in place beneath the purge chamber 114 with the handle 58 moved to the second position.

Furthermore, in this embodiment, the retaining plate 132 and purge chamber 114 are held in a fixed position relative to the collecting tank 146 by means of a frame 66 extending from the sides of the collecting tank 146 to the retaining plate 132. The clamping means 140 described above therefore draws the mounting plate 138 and filter 101 upwards away from the collecting tank 146 until the flange 108 of the filter 101 abuts the first seal element 134.

This clamping arrangement means that the mounting plate 138 cannot be integrally formed with the collecting tank 146 as previously described. In this case, the collecting tank 146 comprises a receptacle including an upper face 68 having an aperture 69 substantially larger than the opening 139 in the mounting plate 138. The mounting plate 138 is moveable in a direction away from the collecting tank 146 when the handle 58 of the clamping means 140 is moved to the second position. As seen in FIG. 2, the mounting plate 138 includes cut-outs 70 at the corners of the plate 138 that engage with the upright members of the frame 66 and constrain movement of the mounting plate 138 in a vertical direction. The cut-outs 70 are substantially square and extend around two sides of the upright members of the frame 66. In this way, each of the edges of the mounting plate 138 extends between respective pairs of upright members thereby preventing horizontal movement of the mounting plate 138.

A guard portion 72 is attached at one end to the lower surface of the mounting plate 138 and extends through the aperture 69 in the collecting tank 146. In this embodiment, the guard portion 72 is a cylindrical sleeve and the diameter of the guard portion 72 is such that there is a sliding fit of the guard portion 72 in the aperture 69 in the upper face of the waste tank 146. The diameter of the guard portion 72 is greater than the diameter of the anti-surge chamber (not shown) and the guard portion 72 surrounds at least an upper section of the anti-surge chamber. When the mounting plate 138 is moved in a direction away from the waste tank 146 to clamp a filter 101, the guard portion 72 slides so that it projects from the top of the waste tank 146 and spans the gap between the mounting plate 138 and the waste tank 146.

Support members 142 span the opening 139 in the mounting plate 138. The support frame 143 comprises a central ring with support members 142 extending radially outwards from the ring to support each section of a filter core 102 as described previously.

In this embodiment, an expansion chamber 74 and chimney 76 are connected to the outlets of the waste tank 146. Because the volume of the waste tank 146 is much larger than the volume of the purge chamber 114 and filter 101, as the compressed air exits the filter 101 it rapidly expands. This large volume of air passes out of the waste tank 146 primarily through the vent (not shown) and escapes to atmosphere via the chimney 76. The pressure of the water also drops as it exits the filter 101, and the water and particulate matter fill the waste tank 146. Excess waste water flows through the outlet 152 into the expansion chamber 74.

In some embodiments, a filter (not shown) may be fitted to an outlet of the waste tank 146 or expansion chamber 74. This would allow the waste water, contaminated with soot and ash, to be filtered and recycled, to be used again.

A third preferred embodiment of the present invention is shown in FIGS. 4 to 7. In this example the apparatus 212 is designed to be a fully self-contained unit. In particular, the entire apparatus 212 is mounted within a supporting frame 218, which may be substantially enclosed by a cover (not shown). Because the apparatus 212 of this embodiment is designed to be entirely self-contained, it may be mounted in a trailer (not shown). The apparatus 212 would then be fully mobile, allowing it to be transported to different depots, for example, to clean the exhaust filters for different fleets of vehicles.

The supply of compressed air to be fed into the purge chamber 214 is stored within pressurised cylinders 78 mounted on one side of the purge chamber 214. The water supply is stored in a water tank 79 mounted on the other side of the purge chamber 214, however, in other embodiments the water may also be stored in pressurised cylinders. As in previous embodiments, the water and air are fed into the top of the purge chamber 214 through flexible pipes (not shown).

The retaining plate 232 and purge chamber 214 are connected to the top of the supporting frame 218. Pistons 240 are attached at one end to the top of the frame 218 and are attached at the other end to the top surface of the retaining plate 232. The pistons 240 are arranged to push the retaining plate 232 and purge chamber 214 downwards when a filter 201 to be cleaned is in position beneath the retaining plate 232. Mechanical locking means (not shown) actuate and lock the retaining plate 232 in this lowered position on top of the filter 201 so that the backpressure of the gas entering the filter 201 during the cleaning process does not cause the retaining plate 232 to be forced away from the top of the filter 201.

Figure 6:
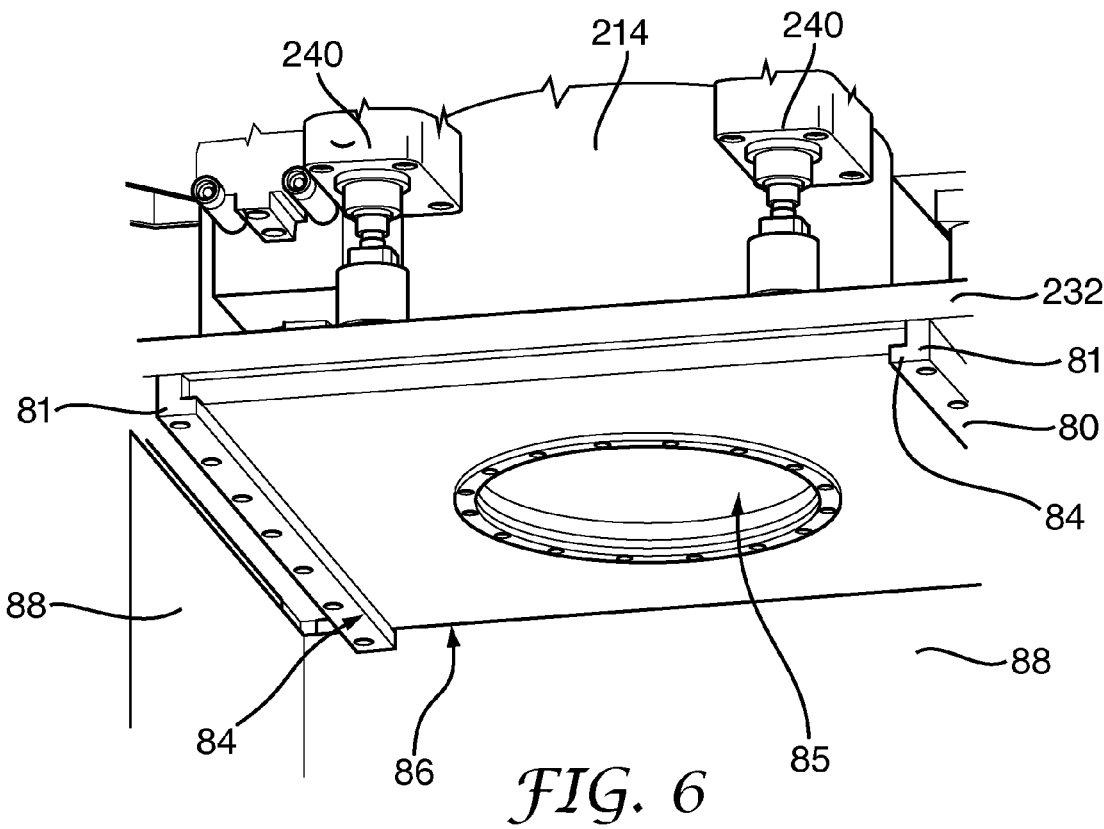
FIG. 6 shows the upper adaptor plate and retaining plate of the apparatus of FIG. 4.
Figure 7:
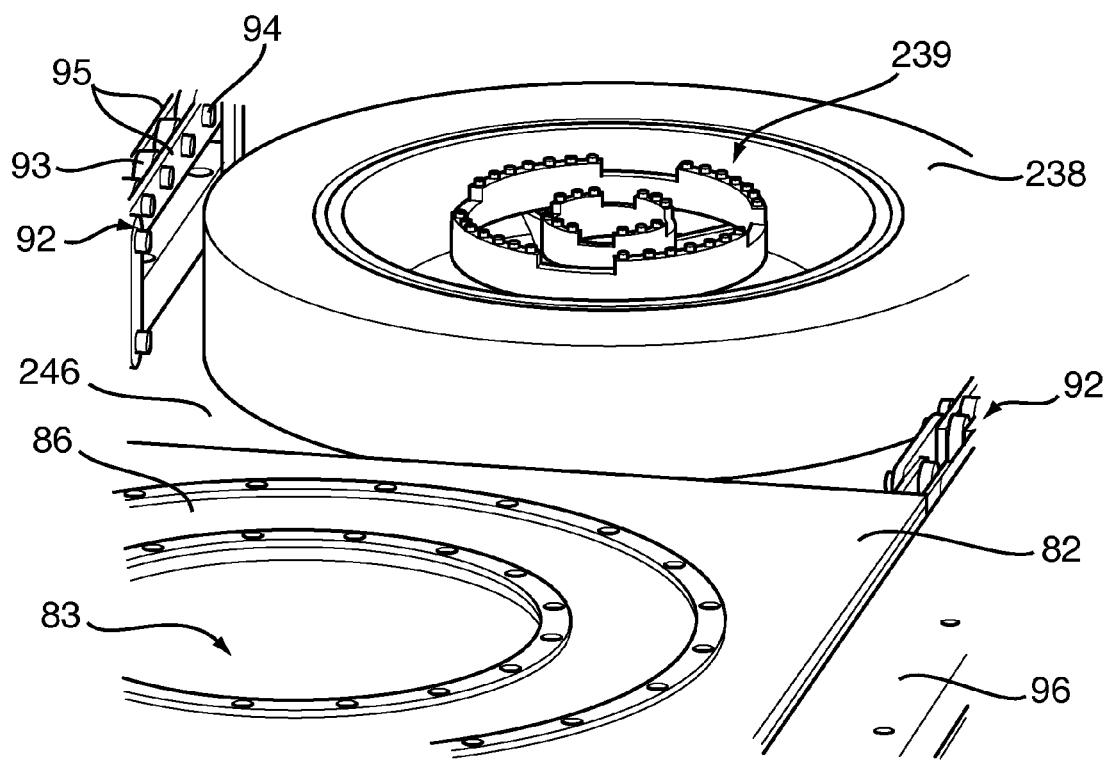
FIG. 7 shows the loading mechanism of the apparatus of FIG. 4.
Figure 8:
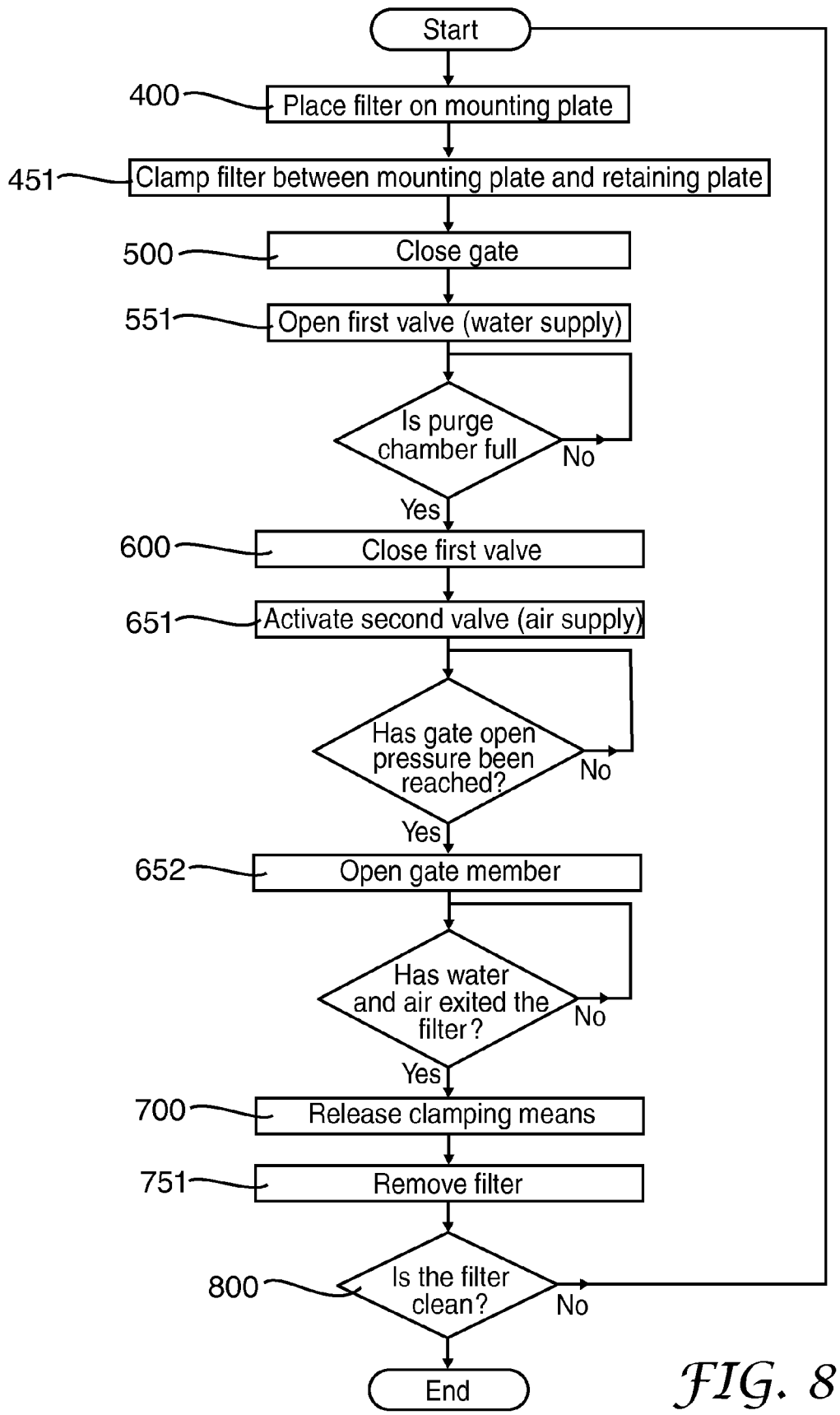
FIG. 8 is a flow diagram of a cleaning method in accordance with an embodiment of the present invention.

In this embodiment the seal elements comprise adaptor plates 80, 82, shown in FIGS. 6 and 7. Guide rails 81 are fixed to the underside of the retaining plate 232 to locate and support a first upper adaptor plate 80. The guide rails 81 have an L-shape cross-section such that the rails 81 extend perpendicularly downwards from the retaining plate 232 and a lower portion 84 of the guide rails 81 projects towards the centre of the retaining plate 232. There is a sliding fit of the first adaptor plate 80 between the guide rails 81, and edge regions of the adaptor plate 80 rest on the inwardly projecting portions 84 of the guide rails 81 with the upper surface of the adaptor plate 80 in contact with the lower surface of the retaining plate 232.

Pairs of adaptor plates 80, 82 are interchangeable and allow the apparatus 212 to accommodate different sized filters 201, in particular filters having different diameters. Each pair of adaptor plates 80, 82 has apertures 85, 83 of different diameters, which may be chosen to correspond to the diameter of a filter 201 to be cleaned. In practise it is likely that three pairs of adaptor plates having apertures with different diameters will be sufficient to clean a number of different filter types, for example, filters with different flange geometries and filters with diameters between 160 and 370 mm.

The openings in the mounting and retaining plates have a fixed diameter and this is generally chosen to be substantially equal to, but no larger than, the diameter of the largest filter 201 to be cleaned. Therefore, to accommodate a narrower filter, an adaptor plate 80, 82 with a smaller aperture 85, 83 is positioned at either end of the filter 201, so that the circumference of the aperture 85, 83 is not greater than the circumference of the filter core thereby preventing a loss of fluid around the outside of the filter 201. Necessarily, the adaptor plates 80, 82 include sealing layers 86 on both faces to form fluid-tight seals between both the retaining plate 232 and a first filter flange 208 and the mounting plate 238 and second filter flange 208.

The apparatus 212 also comprises a loading mechanism to aid in the loading and removal of a filter 201 from between the retaining 232 and mounting 238 plates.

In this example, the mounting plate 238 is integrally formed with the top of the waste tank 246. Shielding walls 88 extend vertically upwards from the top of the waste tank 238. When a filter 201 to be cleaned is in position in the apparatus 212, it is surrounded on three sides by the shielding walls 88 that extend at least between the waste tank 246 and the retaining plate 232. In this way the shielding walls 88 form back and side faces of an enclosure around the filter 201.

Figure 4:
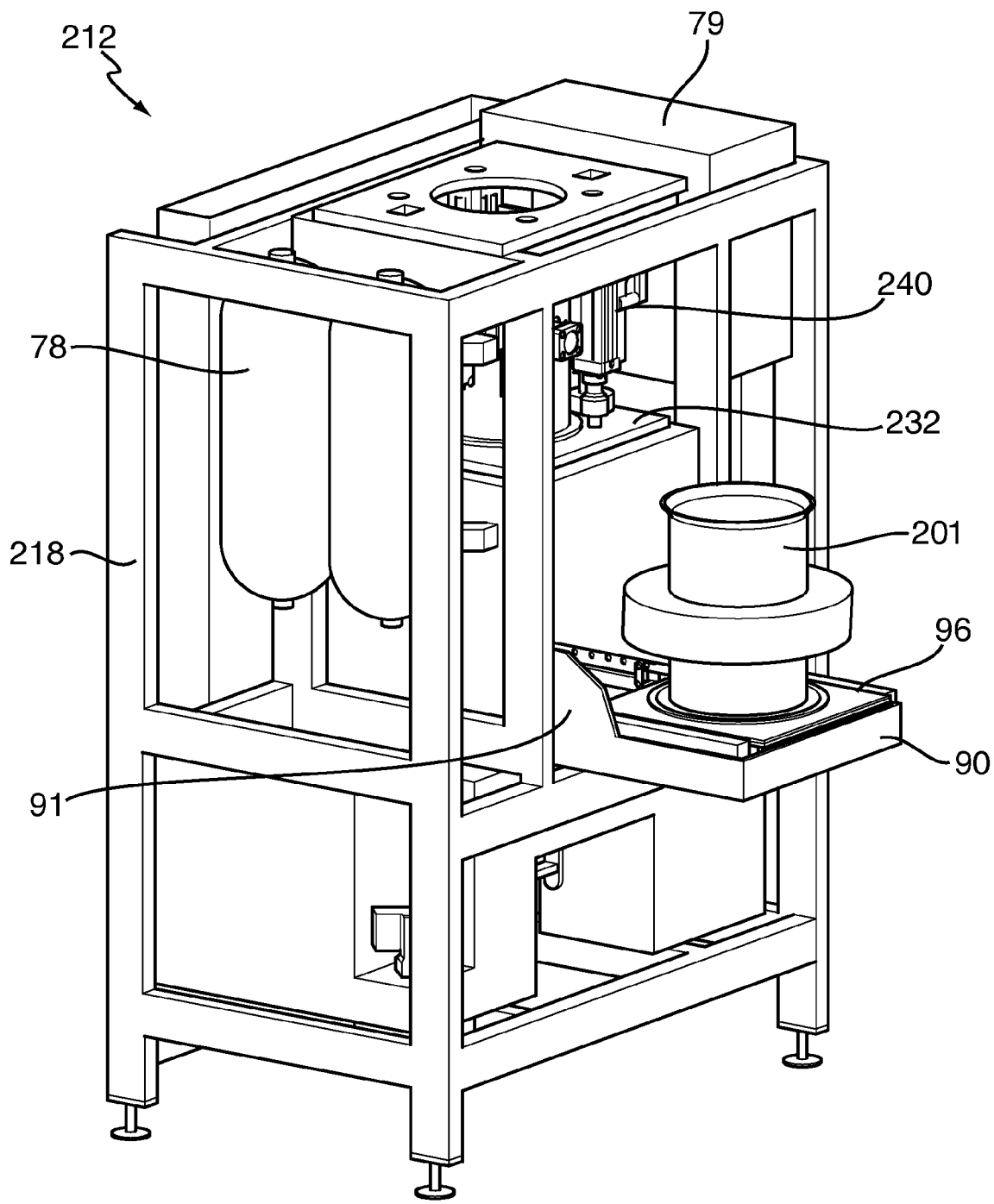
FIG. 4 shows a perspective view of an apparatus for cleaning a vehicle exhaust system filter according to a third embodiment of the present invention.
Figure 5:
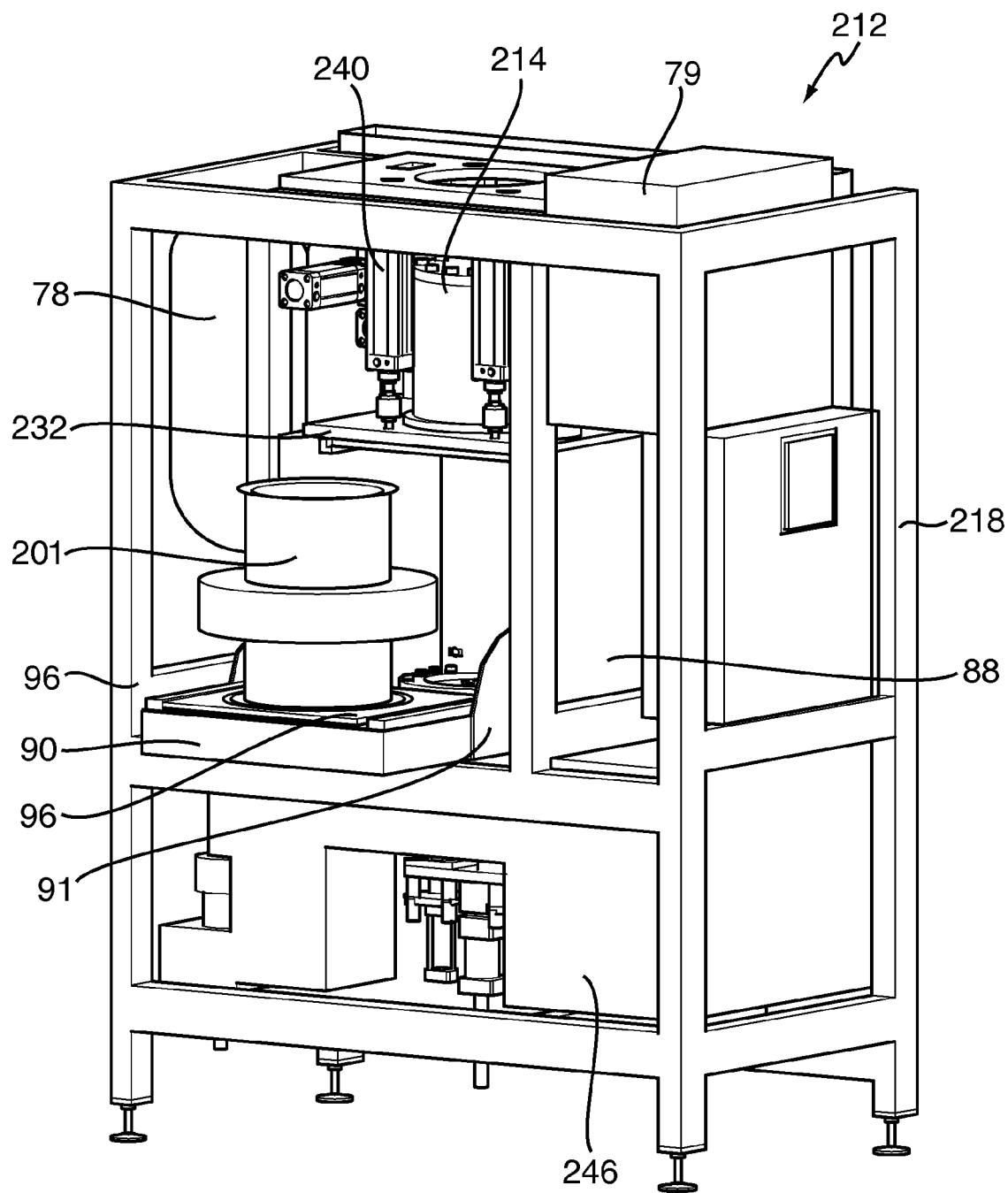
FIG. 5 shows a second perspective view of the apparatus of FIG. 4.

The front face of the enclosure is formed by a hinged door 90. The door 90 is rectangular and is hinged along its lower edge. The hinge mechanism 91 is such that the door 90 is able to rotate through about 90° from a closed position in which the plane of the door 90 is substantially vertical, to an open position in which the plane of the door 90 is substantially horizontal and the door 90 extends from the front of the apparatus 212, as shown in FIGS. 4 and 5.

A line of rollers 92 are mounted either side of the opening 239 in the top of the waste tank 246. The rollers 92 comprise discs or wheels 93 mounted such that the wheels 93 in each line of rollers 92 lie in the same plane and the rotational axes of the wheels 93 are evenly spaced apart. The axles 94 about which each of the wheels 93 rotate pass through parallel support rails 95. The support rails 95 and axles 94 are arranged such that all of the wheels 93 are able to rotate freely and independently of each other.

The lines of rollers 92 are fixed so that the tops of the wheels 93 are in the same plane as the upper surface of the door 90 when it is open. A second lower adaptor plate 82 is arranged to move or slide horizontally, with the aid of the rollers 92, between a cleaning position and a loading position.

In the cleaning position, the second adaptor plate 82 is located inside the frame 218 such that edge portions of the adaptor plate 82 sit on the lines of rollers 92, and an aperture 83 in the second adaptor plate 82 is aligned with the opening 239 in the top of the waste tank 246. The adaptor plate 82 can then be slid over the rollers 92 to the loading position.

In the loading position, the adaptor plate 82 sits on the upper face of the open door 90. Additional guide rails 96 may be provided along the edges of the door 90 to prevent the adaptor plate 82 moving sideways as it slides forwards. In this loading position a filter 201 may be easily placed onto the adaptor plate 82 with the filter core aligned with the aperture 83 in the adaptor plate 82.

Once a filter 201 has been placed on the lower adaptor plate 82 it is slid back to the cleaning position, so that a fluid pathway exists between the filter core and the waste tank 246. The pistons 240 are then activated to push the retaining plate 232 towards the filter 201 to form a fluid-tight seal between the filter flanges 208 and the adaptor plates 80, 82.

The door 90 of the enclosure is then closed to contain any fluids that may escape from the filter 201 during cleaning.

In other embodiments, adaptor plates 80, 82 may not be required or used and the mounting plate may be separate from the waste tank and may be adapted to move between similar loading and cleaning positions as described.

It will be appreciated that the above embodiments describe specific examples of apparatus according to the invention and include several optional and preferred features.

In other embodiments, the apparatus may not comprise a separate retaining plate and an opening may be formed in a lower face of the purge chamber, with a seal element placed directly on the underside of this lower face. In this case, it is necessary that the periphery of the purge chamber is larger than the circumference of the largest filter to be cleaned to ensure that a seal can always be formed between the seal element and the flange of the filter.

In other embodiments alternative clamping means may be used to increase and decrease the gap between the mounting plate and the retaining plate or surge chamber. The clamping means may be arranged to slide the mounting plate towards and away from a static retaining plate, or alternatively to slide the retaining plate towards and away from a static mounting plate. Ideally only one or other of the mounting plate or retaining plate should be movable, however, it may be preferable in some embodiments for the clamping means to move both the mounting and retaining plates to clamp and hold the filter between them.

It will be appreciated that although in the above-described examples the purge chamber, filter and collecting tank have been described as being in vertical alignment with the purge chamber above the filter, these components may be in any suitable arrangement such that the purge chamber is in fluid communication with one end of the filter and the collecting tank is in fluid communication with the opposing end of the filter. However, it is preferable for the filter to be mounted so that the channels of the filter are substantially vertical with the purge chamber above the filter so that gravity aids the movement of fluid through the filter.

The method of cleaning a filter will now be described in more detail with particular reference to FIGS. 8 to 12, and in relation to the embodiment of the apparatus 12 shown in FIG. 2.

A filter 1 to be cleaned is first placed 400 on the mounting plate 38 such that the second end 10 of the filter 1 is in contact with the mounting plate 38. Channels 6 whose open ends were located on the entry side of the exhaust gases in the vehicle exhaust system are therefore positioned with their open ends lowermost, and these channels 6 will be referred to hereinafter as a second set of channels 6b. Channels 6 having their open ends uppermost at the first end 11 of the filter 1 will be referred to as a first set of channels 6a.

The filter 1 is axially aligned with the opening 39 in the mounting plate 38 and, if required, adaptor plates 86 may be inserted or changed to suit the diameter or type of filter 1 being cleaned.

The clamping means 40 is then used to clamp 451 the filter 1 between the mounting plate 38 and the retaining plate 32. The flanges 8 at either end of filter 1 abut the seal elements 34, 36 and the clamping force is such that a substantially fluid tight seal is formed between the seal elements 34, 36 and the filter 1.

A fluid communication pathway then exists between the purge chamber 14 and the waste tank 46, passing through the opening 33 in the retaining plate 32 and aperture 35 in the first seal element 34, through the filter 1 from the first end 11 to the second end 10, and then through the aperture 37 in the second seal element 36 and the opening 39 in the mounting plate 38.

The gate member 44 is moved 500 to a closed position so as to substantially block the opening 39 in the mounting plate 38 and substantially prevent the flow of liquid out of the filter 1. This reduces the amount of water used in this stage of the process and may be used to increase the pressure of the liquid in the filter 1. The gate member is designed to be locked closed and opened when the desired fluid pressure is achieved at the second end of the filter 10 during the cleaning phase 651.

Figure 9:
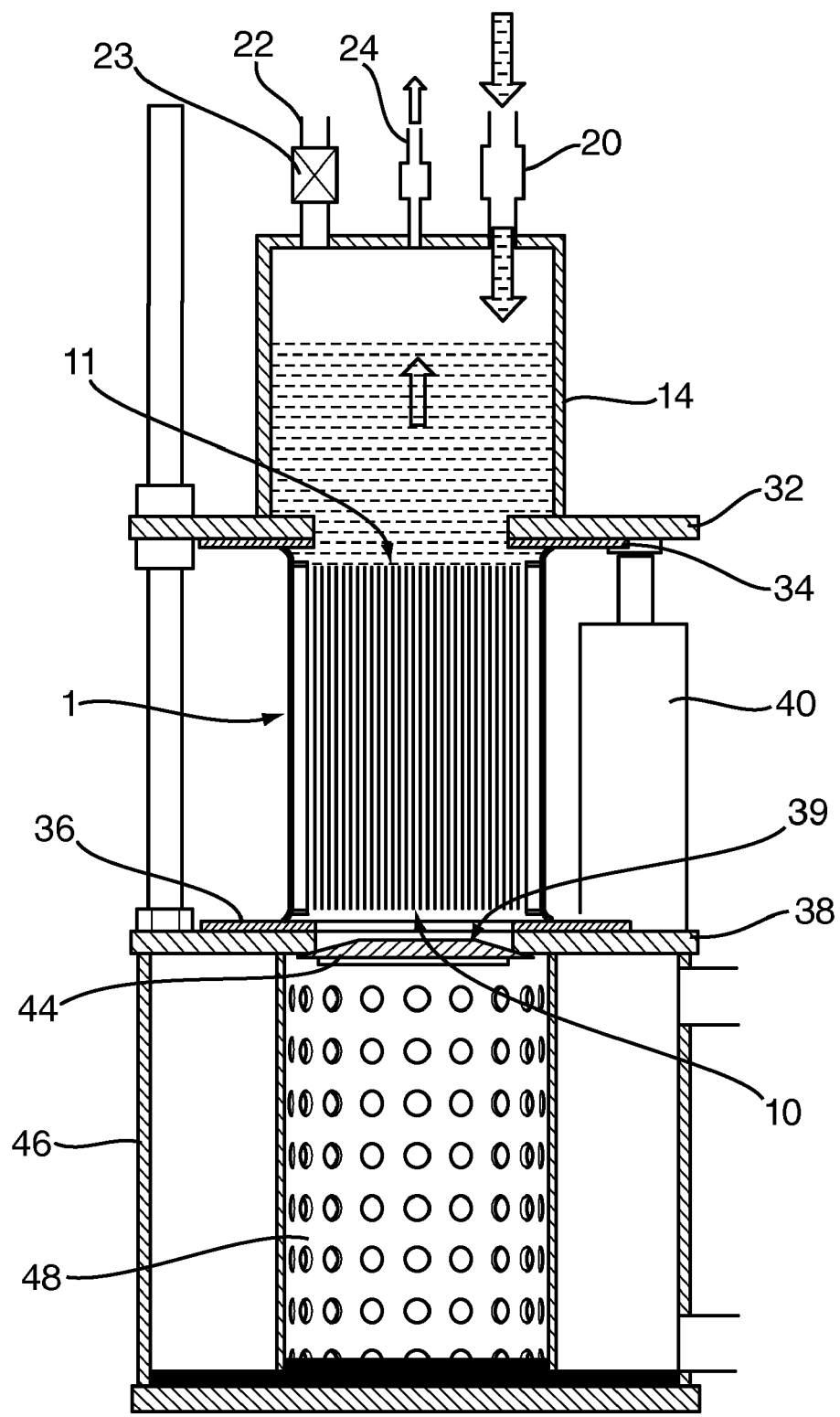
FIG. 9 is a schematic diagram showing a first stage of the method of an embodiment of the present invention.

Once the filter 1 in is position and the gate 44 is closed, the first valve 21 is then opened 551 to allow water to flow into the purge chamber 14, as shown in FIG. 9. The water flows into the filter 1 at its first end 11, and the water primarily fills the first set of channels 6a. Some water flows through the porous walls 7 of the filter 1 and into the second set of channels 6b. The water preferentially flows through those regions of the filter 1 not filled with particulate matter thereby taking the path of least resistance to flow from the first end 11 of the filter 1 to the second end 10. The water may be absorbed by some of the particulate debris in the filter 1 and may start to loosen and remove it, especially from the walls 7 of the channels 6.

However, we have found that if the gate 44 is opened at this time, very little if any particulate matter is seen to flow out of the end of the filter 1 due to the flow of water. This may be because the porous walls 7 of the filter 1 are still substantially blocked and debris within the channels 6 too densely packed to allow significant water flow. The flow across the filter is very much restricted to the area closest to the second end 10 where the resistance to flow is much lower.

Figure 14:
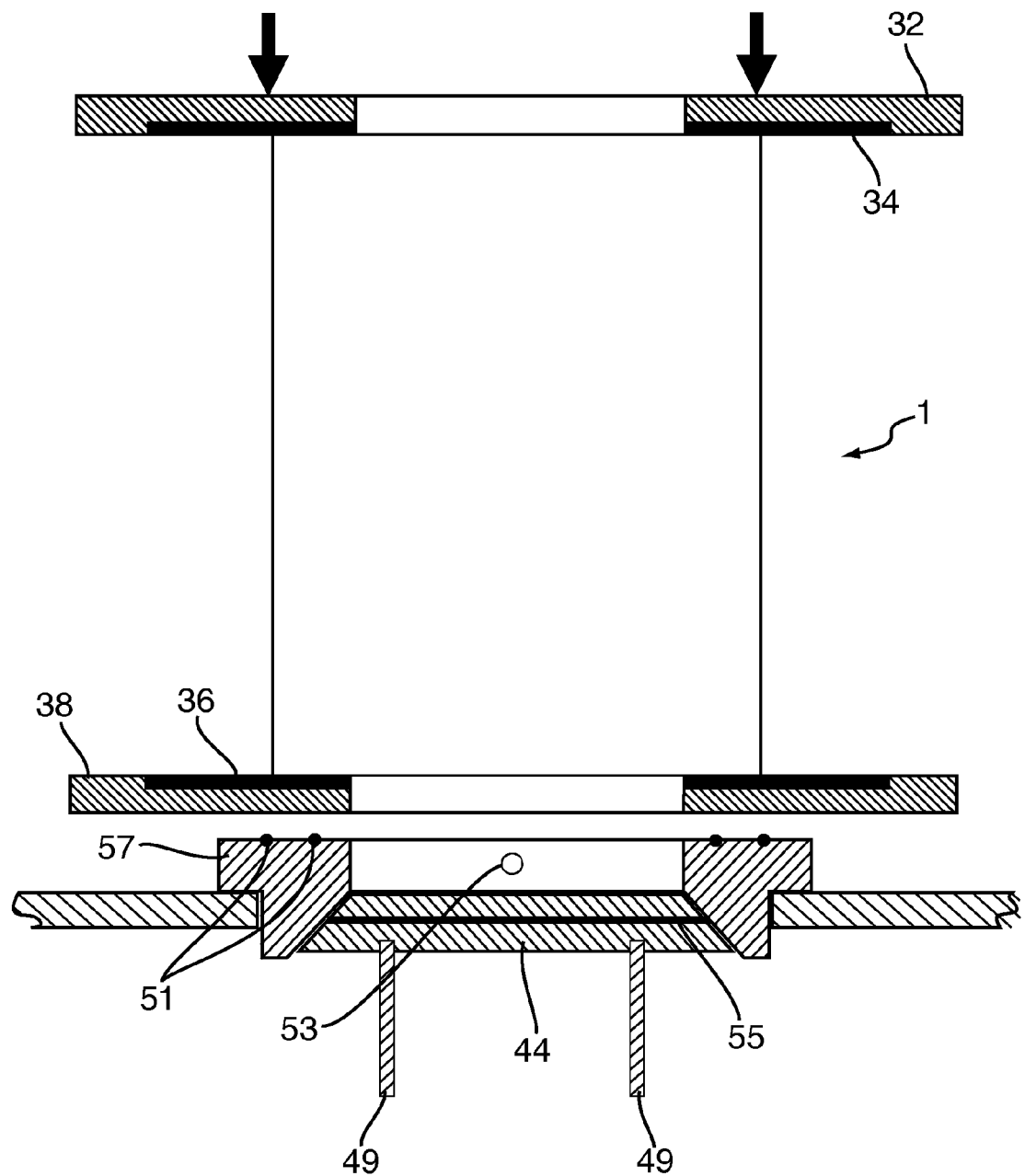
FIG. 14 shows details of seal arrangements of an embodiment of apparatus in accordance with an aspect of the invention.

Referring now to FIG. 14, a seal arrangement for a preferred embodiment is shown. The filter 1 is pressed against the lower filter seal 36 on the filter loading plate 38. The filter loading plate 38 cooperates with a gate seat member 57 which is profiled to receive the gate member 44. O-ring seals 51 provide a fluid-tight seal between the filter loading plate 38 and the gate seat member 57. The gate member (plug) 44 has an internal gate seal 55 which provides a fluid-tight seal between the gate member 44 and the gate seat member 57. When the gate member 44 is fully seated in the gate seat member 57, the second end 10 of the filter is fully sealed. A pressure transducer is provided within the gate seat member 57, via a port 53, for measuring pressure beneath the second end of the filter 1. Sealant may be provided between the pressure transducer and the walls of the port 53 to maintain a sealed environment at the second end of the filter 1.

Trials to date have shown that the pressure of the water entering the filter and the purge chamber may vary without a significant difference in the filter cleaning performance. Water pressures of between 0.1 bar (10 kPa) and 3.75 bar (375 kPa) have been compared and it is believed that the pressure has little effect on the overall cleaning. This further supports the idea that the role of the water is primarily to fill the filter channels and loosen or lubricate some of the debris. Under normal operating conditions the water pressure within the chamber is prevented from rising above atmospheric pressure by the vent 24. In practice, water is typically fed into the filter and chamber from a pump with delivery pressure of 2.5 to 3 bar to achieve satisfactory system filling time.

Once the filter 1 is substantially full of water, the water continues to fill the purge chamber 14 above the filter 1. The valve 21 is closed 600 and the flow of water stopped only when the purge chamber 14 is completely full of water. This may be determined by the flow of water out of the vent 24 of the chamber 14, or level switch installed at this point. The level of water within the chamber can be checked through an inspection window provided in the side of the purge chamber 14.

When the supply of water has been stopped, the vent 24 is closed and the second valve activated 651. The second valve 23 only opens for less than 1 second, typically for about 0.8 seconds, to permit a pulse of compressed air to enter the top of the purge chamber 14. In a preferred embodiment, the pulse is such that between 30 and 50 liters (preferably about 40 liters) of compressed gas enters the chamber 14 in about 0.8 seconds. The compressed air may be at a pressure between 3 bar (300 kPa) and 10 bar (1000 kPa). Tests have shown that there is little additional improvement in cleaning performance as the air pressure is raised above 7 bar (700 kPa). As soon as the compressed air enters the chamber 14, pressure is transmitted through the water and is detected by a pressure sensor located between the gate member 44 and the filter second end 10. At the preset pressure, typically about 0.2 to 0.25 bar (20 to 25 kPa) a control unit signals the pneumatic-operated pistons 47 to release rod locks and open the gate member 44 (652) allowing the compressed gas to expand within the chamber and filter as the water is driven out of the second end of the filter. Because of the time delay between the threshold pressure being measured, and opening of the gate member 44, the pressure above the gate member may reach about 1 bar (100 kPa) prior to its opening.

A pressure differential now exists between the second end 10 and the first end 11 of the filter. Measurement of this backpressure has proven to be a very good indication of the degree of blockage within the filter. Optimum safe cleaning performance for any given filter is controlled by setting of the air pulse pressure and the pressure at which the gate member is opened.

Figure 10:
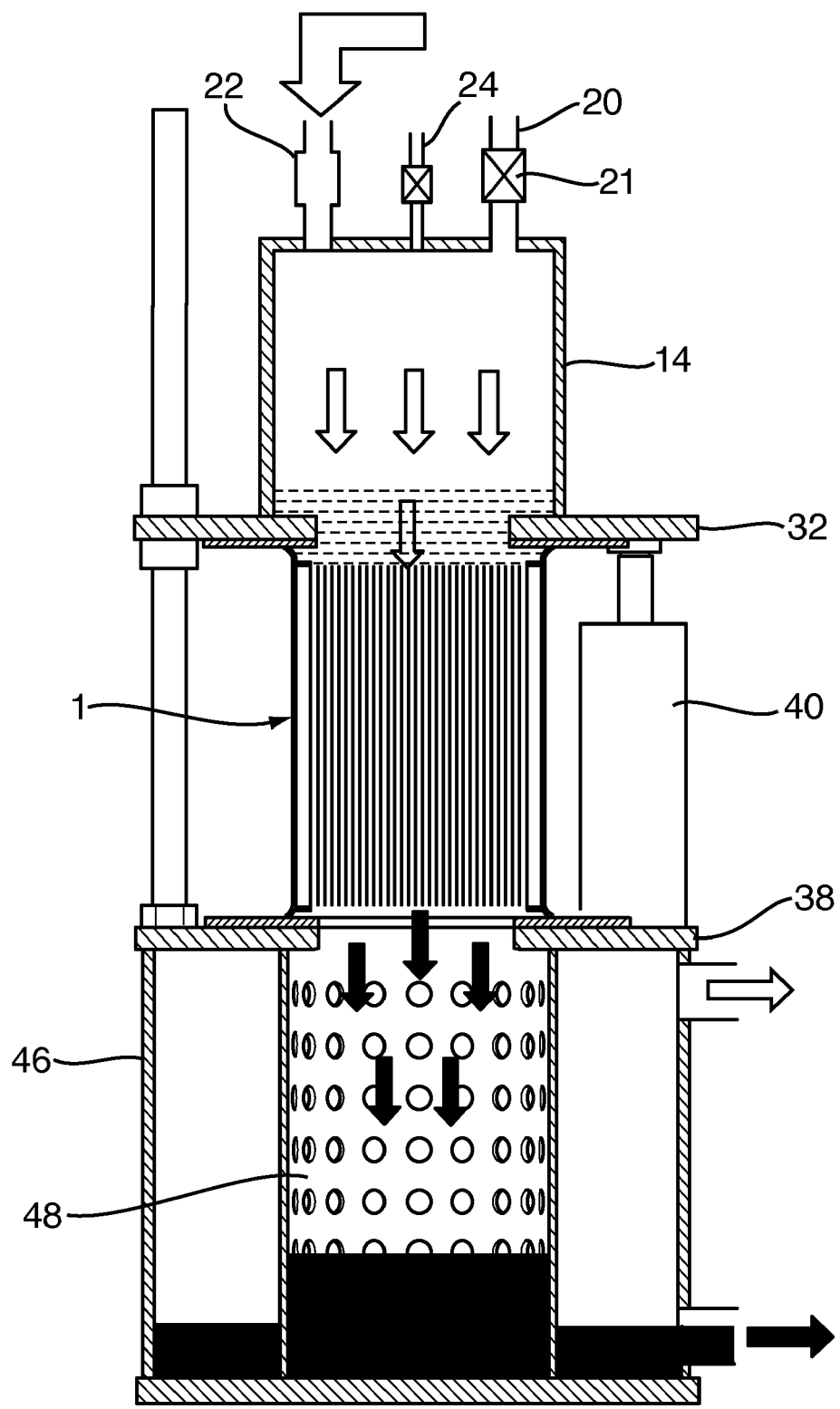
FIG. 10 is a schematic diagram showing a second stage of an embodiment of the method of the present invention.
Figure 11:
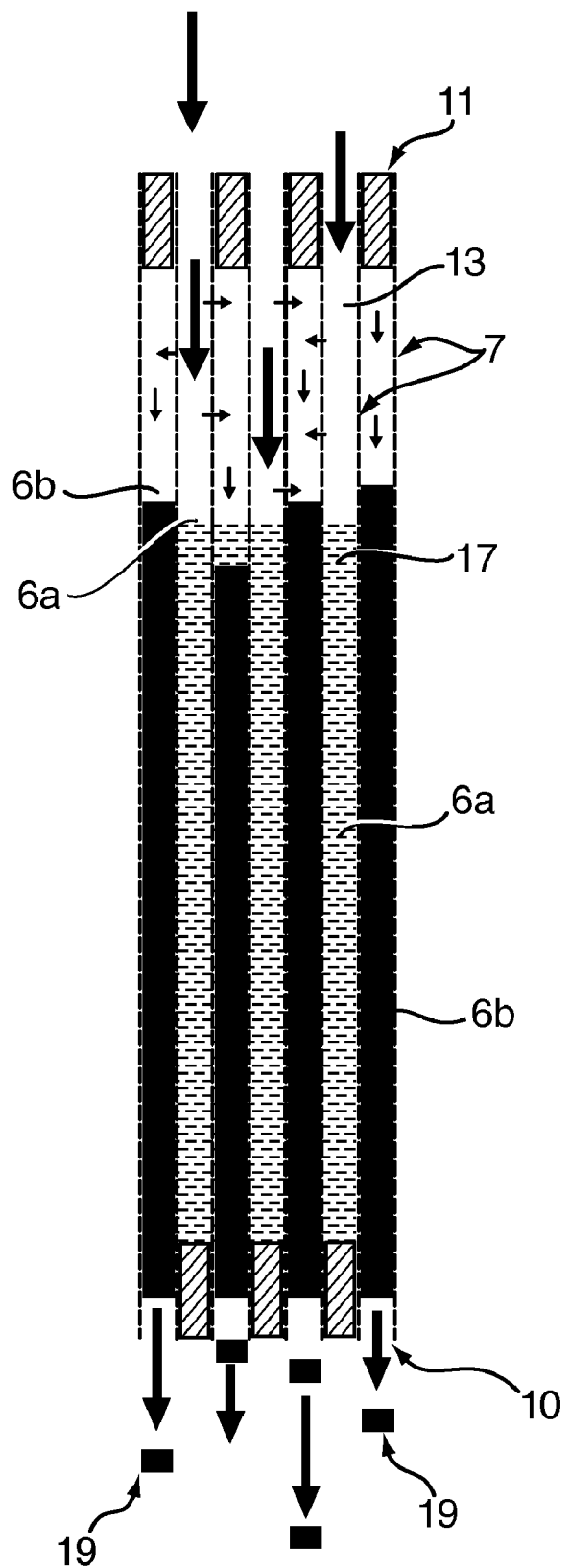
FIG. 11 is a schematic diagram illustrating the flow of liquid and gas through a filter.

Without wishing to be bound by theory, we believe that what may be happening during the cleaning process is as follows. The pulse of compressed air creates a pressure wave that pushes the water out of the purge chamber 14 and through the filter 1 at high speed, as shown in FIG. 10. When the level of the water has dropped to below the face of the filter 1, the air then has a choice of which path it takes through the filter 1. This process is illustrated in FIG. 11.

Because the first set of channels 6a is at least substantially full of water 17, the air 13 preferentially flows through the porous walls 7 of the filter 1. This is because the air molecules find it easier to move through the partially blocked pores in the ceramic walls 7 than to try and force the water through them. This movement of air through the walls 7 dislodges the trapped soot and other particulate matter 19 which is carried out of the pores in the walls 7 and into the second set of channels 6b. It is further hypothesised that if the first set of channels 6a were not substantially filled with water 17, the air 13 would flow along these channels 6a and then pass through the porous walls 7 near the second end 10 of the filter 1 and exit through the open ends of the second set of channels 6b. With the first set of channels 6a filled with water, the air preferentially flows through the pores of the filter walls 7 near the upper first end 11 of the filter 1 and behind the ash and soot 19 collected in the cells 6b. This means that air flows along substantially the entire length of the second set of channels 6b, rather than just a lower end portion proximal their open ends. As the expanding air 13 flows along the second set of channels 6b, soot and ash (debris) 19 blocking these channels 6b is driven out at great speed. As the water level within the filter continues to fall, air passes across the filter walls 7 at levels continually closer to the second end 10 cleaning the pore structure until all water, soot and ash 19 has been driven out and the air pressure can dissipate freely. This whole process takes place very quickly, typically in under 1 second.

FIG. 12 shows two traces 99 of the pressures measured in the purge chamber 14 during the cleaning process. The initial stage of the process comprising filling the filter 1 and purge chamber 14 with water takes approximately 15 seconds, but may take between about 10 and 25 seconds depending on the volume of the filter 1 and purge chamber 14 and the pressure of the water. A rapid increase in pressure is seen in the purge chamber 14 due to the pulse of compressed air 'cleaning pulse'. The time taken for the pressure wave to move through the chamber 14 and filter 1 is substantially less than 1 second and is generally between 0.2 and 0.5 seconds.

Very shortly after the second valve 23 is opened, a blast of air, water and ash (and other debris) exits the second end 10 of the filter 1 at high speed. This waste fluid enters the anti-surge chamber 48, and is initially contained within the waste tank 46 before flowing into the expansion chamber and/or chimney if present. After a short delay the second valve 23 is reopened for a period of about 1 second introducing a second pulse of compressed air ('test pulse'). This second pulse of air serves the functions of providing a means of measurement of filter cleanliness and drying the filter of excess water. The pulse may be repeated for additional drying, optionally with the use of hot air. Once all of the water and air has exited the filter, the clamping means 40 is released 700 and the filter 1 is removed 751 from the apparatus 12.

Tests have also been carried out using compressed $CO_2$ as the compressed gas. It was found that $CO_2$ did not clean the filters as well as compressed air. This may be due to the larger size of the $CO_2$ molecule resulting in restricted or slower flow through the porous walls of the filter.

The cleaned filters 1 are then inspected 800 using transmitted light in accordance with the method described in WO 2006/016117. A second end of the filter 1 is illuminated by a light source and the first end of the filter 1 is viewed through an optical arrangement and camera to determine the amount of light that is able to pass through the filter 1. The greater the intensity of the light emitted from the channels open at the first end of the filter 1, the cleaner the filter. A threshold transmitted light intensity must be reached over the majority of the area of the filter 1 before the filter is determined to be 'clean'. Areas of very high light intensity indicate missing end plugs or damage to the integrity of the channel walls 7. After testing the filter is reversed and viewed from the first end. FIG. 13 shows examples of both a clean filter (top views) and an irrecoverable filter (bottom views) after processing.

In alternative embodiments, data from measurements of the backpressure may be used to determine if a filter is sufficiently clean. The backpressure data recorded during the cleaning process is monitored and the cleaning cycle can be repeated, until the backpressure is reduced to a level below the threshold value at the 'test air pulse' point in the cleaning process. Backpressure is recorded during both the 'cleaning' and 'test' air pulses. The peak backpressure obtained during the 'cleaning' pulse gives a good indication of the extent of the blockage in the filter core and the peak pressure obtained during the 'test' pulse a good indication of the cleanliness of the filter or the accessible volume through which the compressed air can flow, as discussed previously. This inspection method has the advantage that the filter does not have to be removed from the apparatus after each run, but the cleaning method can be automatically repeated until the threshold value is reached.

Typical pressure differentials denoting a clean filter will vary with the type of filter material and filter dimensions; in an example cordierite filter, we have found that a pressure differential of about 1.8-2.4 bar (180-240 kPa) was consistent with an adequately cleaned filter.

Previous methods used to clean filters, for example compressed air jets or high pressure water are typically time consuming and very messy. In addition, in the case of heavily blocked filters in particular, it is unlikely that the entire length of the filter will be cleaned successfully. For example, compressed air may be directed into both ends of the filter, but this may not reach the central or lower regions of the filter which remain blocked with soot and ash and is very difficult to clean.

Using the apparatus and method of the present invention it has been found that is it possible to clean approximately 95% of passive filters, including heavily clogged filters, with only one application of the new process. Previously, using high pressure water alone, only about 75% of filters were 'clean' after a first pass through the cleaning process. The method gives far superior results to those achieved using compressed air alone.

Very heavily soiled passive filters and active filters used in conjunction with fuel borne catalysts generally require several cycles within the apparatus before thorough cleaning is achieved. It has been found beneficial to reverse these filters within the apparatus thus cleaning from both directions.

The cleaning apparatus and method of the present invention therefore provides substantial improvements over existing cleaning methods both in terms of time savings and cleaning ability.

The invention claimed is:

1. A method of cleaning a vehicle exhaust system filter, the filter having a first end and a second end and comprising a plurality of elongate channels containing debris to be removed, wherein the method comprises the steps of:
    (i) providing a chamber having an outlet in fluid communication with the first end of the filter;
    (ii) covering the second end of the filter to hinder fluid flow out of the second end of the filter;
    (iii) introducing a flow of liquid into the chamber;
    (iv) stopping the flow of liquid into the chamber when the chamber and channels of the filter are substantially filled with liquid;
    (v) introducing a pulse of compressed gas into the chamber;
    (vi) measuring pressure at the covered second end of the filter, and
    (vii) uncovering the second end of the filter only when a predetermined threshold pressure has been measured, to allow the gas to force said debris and liquid out of the second end of the filter.

2. A method of cleaning a vehicle exhaust system filter as claimed in claim 1, wherein the liquid is water.

3. A method of cleaning a vehicle exhaust system filter as claimed in claim 2, wherein the water is introduced at a pressure below 300 kPa.

4. A method of cleaning a vehicle exhaust system filter as claimed in claim 1, wherein the gas is air.

5. A method of cleaning a vehicle exhaust system filter as claimed in claim 4, wherein the method includes supplying compressed air at a pressure of between 300 and 1000 kPa.

6. A method of cleaning a vehicle exhaust system filter as claimed in claim 1, wherein the compressed gas is introduced into the filter at between 25 and 150 liters per second.

7. A method as claimed in claim 1, wherein the method comprises providing a receptacle in fluid communication with the second end of the filter for collecting the liquid, gas and debris expelled from the second end of the filter.

8. An apparatus for cleaning a vehicle exhaust system filter, the filter having a plurality of elongate channels extending between first and second ends of the filter, the apparatus comprising:
    a chamber;
    inlet means for introducing fluids into the chamber;
    an outlet from the chamber;
    means for holding said filter such that the first end of the filter is in fluid communication with the outlet of said chamber;
    a gate member for hindering the flow of fluid from the second end of the filter during at least part of the cleaning process;
    a pressure sensor for measuring pressure between the gate member and the second end of the filter; and
    means for moving the gate member away from the second end of the filter in response to a threshold pressure being measured.

9. An apparatus as claimed in claim 8, wherein the inlet means includes a first inlet connected to a source of liquid and a second inlet connected to a source of compressed gas.

10. An apparatus as claimed in claim 8, wherein when the filter is being held by the holding means, said filter is in contact with the chamber and the first end of said filter is aligned with the outlet of the chamber.

11. An apparatus for cleaning a vehicle exhaust system filter as claimed in claim 8, wherein the apparatus further comprises a second chamber having an inlet, the inlet of the second chamber being in fluid communication with the second end of said filter.

12. An apparatus for cleaning a vehicle exhaust system filter as claimed in claim 8, the filter having end faces at which the elongate channels terminate, wherein the apparatus further comprises means for supporting said end faces of the filter.

13. An apparatus for cleaning a vehicle exhaust system filter as claimed claim 8, wherein the apparatus further comprises means for locating a filter to be cleaned such that the first end of said filter to be cleaned is in fluid communication with the outlet of the chamber, and means for removing a cleaned filter such that said cleaned filter is not in fluid communication with the outlet of the chamber.

14. An assembly for cleaning a vehicle exhaust system filter, the assembly comprising an apparatus for cleaning a vehicle exhaust system filter as claimed in claim 8, wherein the apparatus is mounted on a trailer.

* * * * *